US012351434B2

(12) United States Patent
Gentile et al.

(10) Patent No.: US 12,351,434 B2
(45) Date of Patent: Jul. 8, 2025

(54) SAFETY SYSTEM BASED ON HOISTWAY ACCESS DETECTION

(71) Applicant: Otis Elevator Company, Farmington, CT (US)

(72) Inventors: Giacomo Gentile, Bologna (IT); Davide Martintoni, Trentino-Alto Adige (IT); Enrico Manes, Feeding Hills, MA (US); Luca Manica, Riva del Garda (IT); Marco Rocchetto, Verona (IT); Valerio Senni, Rome (IT)

(73) Assignee: OTIS ELEVATOR COMPANY, Farmington, CT (US)

( * ) Notice: Subject to any disclaimer, the term of this patent is extended or adjusted under 35 U.S.C. 154(b) by 1608 days.

(21) Appl. No.: 16/711,573

(22) Filed: Dec. 12, 2019

(65) Prior Publication Data

US 2020/0189879 A1 Jun. 18, 2020

Related U.S. Application Data

(60) Provisional application No. 62/779,499, filed on Dec. 14, 2018.

(51) Int. Cl.
*B66B 5/00* (2006.01)
*B66B 1/34* (2006.01)

(52) U.S. Cl.
CPC ............ *B66B 5/005* (2013.01); *B66B 1/3423* (2013.01); *B66B 5/0031* (2013.01)

(58) Field of Classification Search
CPC ....... B66B 5/0031; B66B 5/02; B66B 1/3492; B66B 5/0025; B66B 1/3446; B66B 5/0087; B66B 3/00; B66B 5/0093; B66B 1/00; B66B 5/0043; B66B 5/0056; B66B 1/343; B66B 1/466
See application file for complete search history.

(56) References Cited

U.S. PATENT DOCUMENTS

| | | | |
|---|---|---|---|
| 6,202,797 | B1 | 3/2001 | Skolnick et al. |
| 6,863,161 | B2 | 3/2005 | Mearns et al. |

(Continued)

FOREIGN PATENT DOCUMENTS

| | | | |
|---|---|---|---|
| CN | 105073615 | A | 11/2015 |
| CN | 106542395 | A | 3/2017 |

(Continued)

OTHER PUBLICATIONS

CN Office Action for Application No. 201911278457.8; Issued Dec. 15, 2020; 7 pages.

(Continued)

*Primary Examiner* — Jeffrey Donels
(74) *Attorney, Agent, or Firm* — CANTOR COLBURN LLP

(57) ABSTRACT

Provided are embodiments that include a safety system and method for implementing presence detection. Embodiments can include a receiver that is configured to receive a signal from a transmitter, and a detection module that is configured to detect a signal strength of the signal. Embodiments can also include a processor that is configured to compare the signal strength of the signal with a signal strength threshold, and a task module that is configured to perform a task based at least in part on the comparison.

17 Claims, 4 Drawing Sheets

(56) References Cited

U.S. PATENT DOCUMENTS

| | | | | |
|---|---|---|---|---|
| 7,140,469 | B2 | 11/2006 | Deplazes et al. | |
| 7,201,256 | B2 | 4/2007 | Deplazes et al. | |
| 7,448,473 | B2 | 11/2008 | Lindberg et al. | |
| 7,954,606 | B2 | 6/2011 | Tinone et al. | |
| 8,061,486 | B2 | 11/2011 | Monzon et al. | |
| 8,556,043 | B2 * | 10/2013 | Mangini | B66B 5/0043 187/392 |
| 9,359,171 | B1 | 6/2016 | Nowel | |
| 10,112,802 | B2 * | 10/2018 | Dube | B66B 5/005 |
| 2015/0344265 | A1 | 12/2015 | Hakonen et al. | |
| 2017/0137256 | A1 | 5/2017 | Meguro et al. | |
| 2020/0189879 | A1 * | 6/2020 | Gentile | B66B 5/005 |

FOREIGN PATENT DOCUMENTS

| | | | | |
|---|---|---|---|---|
| CN | 109552951 | B * | 2/2021 | B66B 1/06 |
| EP | 3228576 | A1 * | 10/2017 | B66B 1/3407 |
| EP | 3524559 | A2 | 8/2019 | |
| EP | 3666706 | A1 * | 6/2020 | B66B 1/3423 |
| EP | 3666710 | A1 * | 6/2020 | B66B 1/3423 |
| JP | 2017157469 | A * | 9/2017 | |
| KR | 101405169 | B1 | 6/2014 | |
| WO | WO-2008077980 | A1 * | 7/2008 | B66B 1/3492 |
| WO | 20140955511 | A1 | 6/2014 | |
| WO | WO-2014095511 | A1 * | 6/2014 | F16P 3/147 |
| WO | WO-2016193079 | A1 * | 12/2016 | |
| WO | WO-2017085238 | A1 * | 5/2017 | B66B 1/3492 |
| WO | 2017157469 | A1 | 9/2017 | |
| WO | WO-2017175021 | A1 * | 10/2017 | B66B 1/2408 |
| WO | 2018141576 | A1 | 8/2018 | |

OTHER PUBLICATIONS

EP Search Report for Application No. 19216275.8; Issued: May 13, 2020; 7 pages.

Office Action issued Aug. 9, 2021 for Chinese Application No. 201911278457.8.

* cited by examiner

SAFETY SYSTEM BASED ON HOISTWAY ACCESS DETECTION

CROSS-REFERENCE TO RELATED APPLICATIONS

This application claims the benefit of U.S. Application No. 62/779,499 filed Dec. 14, 2018, which is incorporated herein by reference in its entirety.

BACKGROUND

The present disclosure generally relates to safety systems, and more specifically to a safety system based on hoistway access detection of an elevator system.

Technicians may be required to access the hoistway of an elevator to perform some maintenance tasks, testing, or during an installation process. For example, technicians may need to access areas below the hoistway in the elevator pit or an area directly above the elevator car to perform maintenance. Safety systems may fail or be disabled by a technician so that the technician can perform various tests and inspections.

SUMMARY

According to an embodiment, a safety system for implementing presence detection is provided. The system can include a receiver that is configured to receive a signal from a transmitter, and a detection module configured to detect a signal strength of the signal. The system can also include a processor that is configured to compare the signal strength of the signal with a signal strength threshold, and a task module that is configured to perform a task based at least in part on the comparison.

In addition to one or more of the features described herein, or as an alternative, further embodiments include an elevator controller that is operably coupled to the processor, where the elevator controller is configured to control an elevator car operating in a hoistway.

In addition to one or more of the features described herein, or as an alternative, further embodiments include an elevator position and signal strength module that is configured to associate a current position of the elevator car in the hoistway to a signal strength threshold.

In addition to one or more of the features described herein, or as an alternative, further embodiments include an elevator position and signal strength module that is configured to associate a current position of the elevator car in the hoistway to an expected signal strength.

In addition to one or more of the features described herein, or as an alternative, further embodiments include an elevator position and signal strength module that is configured to store signal strength threshold values during at least one of a normal mode of operation or a test mode of operation.

In addition to one or more of the features described herein, or as an alternative, further embodiments include using a signal strength threshold is based on at least one of a position of the elevator car in the hoistway or a reduction in an expected signal strength of the signal.

In addition to one or more of the features described herein, or as an alternative, further embodiments include an operational status module that is configured to track a current state of the elevator system.

In addition to one or more of the features described herein, or as an alternative, further embodiments include a task module that is configured to transmit an alert indicating a presence of an object or person in the hoistway.

In addition to one or more of the features described herein, or as an alternative, further embodiments include a task module that is configured to verify a current state of the elevator system by transmitting a prompt to an operator.

In addition to one or more of the features described herein, or as an alternative, further embodiments include using signal that is a Wi-Fi signal.

According to another embodiment, a method for operating a safety system implementing presence detection is provided. The method includes receiving a signal, monitoring, by a detection module, a signal strength of the signal, comparing the signal strength of the signal with a signal strength threshold, and performing a task based at least in part on the comparison.

In addition to one or more of the features described herein, or as an alternative, further embodiments include controlling, by an elevator controller, an elevator car operating in a hoistway.

In addition to one or more of the features described herein, or as an alternative, further embodiments include associating a current position of the elevator car in the hoistway to a signal strength threshold.

In addition to one or more of the features described herein, or as an alternative, further embodiments include associating a current position of the elevator car in the hoistway to an expected signal strength.

In addition to one or more of the features described herein, or as an alternative, further embodiments include storing signal strength threshold values during at least one of a normal mode of operation or a test mode of operation.

In addition to one or more of the features described herein, or as an alternative, further embodiments include using a signal strength threshold that is based on at least one of a position of the elevator car in the hoistway or a reduction in an expected signal strength of the signal.

In addition to one or more of the features described herein, or as an alternative, further embodiments include tracking a current state of the elevator system.

In addition to one or more of the features described herein, or as an alternative, further embodiments include transmitting an alert indicating a presence of an object or person in the hoistway.

In addition to one or more of the features described herein, or as an alternative, further embodiments include verifying a current state of the elevator system by transmitting a prompt to an operator.

In addition to one or more of the features described herein, or as an alternative, further embodiments include using a signal that is a Wi-Fi signal.

Technical effects of embodiments of the present disclosure include providing enhanced safety for operators and maintenance technicians that are present in an elevator hoistway during testing and inspection.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

With the introduction of wireless communication systems inside elevator hoistways, the wireless field can be used to detect the presence of a person inside the hoistway and provide additional safety controls. The techniques can be used to detect any inconsistency between the operational status of the elevator and a presence detected in the hoistway. For example, in the event an existing safety system fails to activate a safety mode or a service technician omits or bypasses the safety mode, the operational status of the elevator system can be verified with respect to the detected presence in the hoistway which provides an additional safety check which can disable the operation of the elevator car responsive to the detection of the presence of a person inside the hoistway. In one or more embodiments, a wireless signal such as a Wi-Fi signal that is used for communication can be leveraged to detect the presence of a person or object in the hoistway of an elevator.

Figure 1:
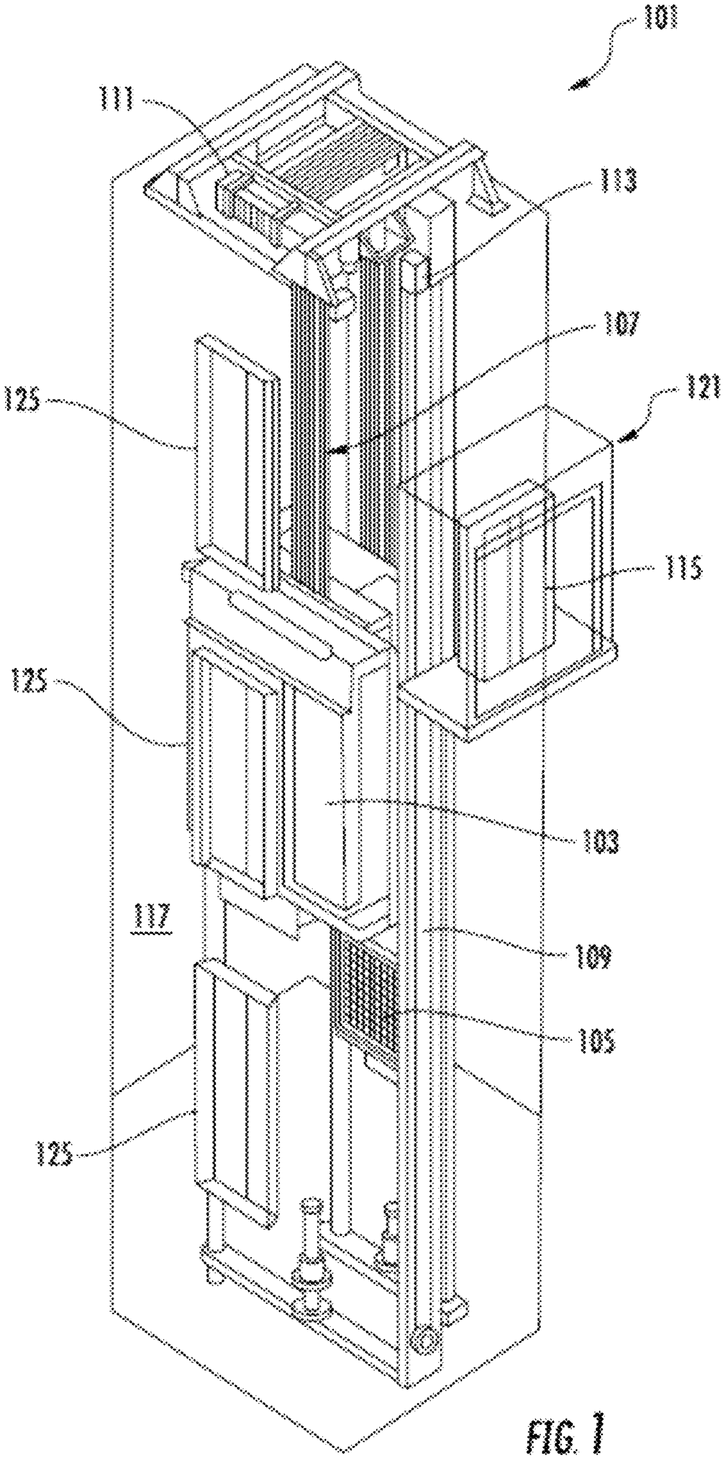
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
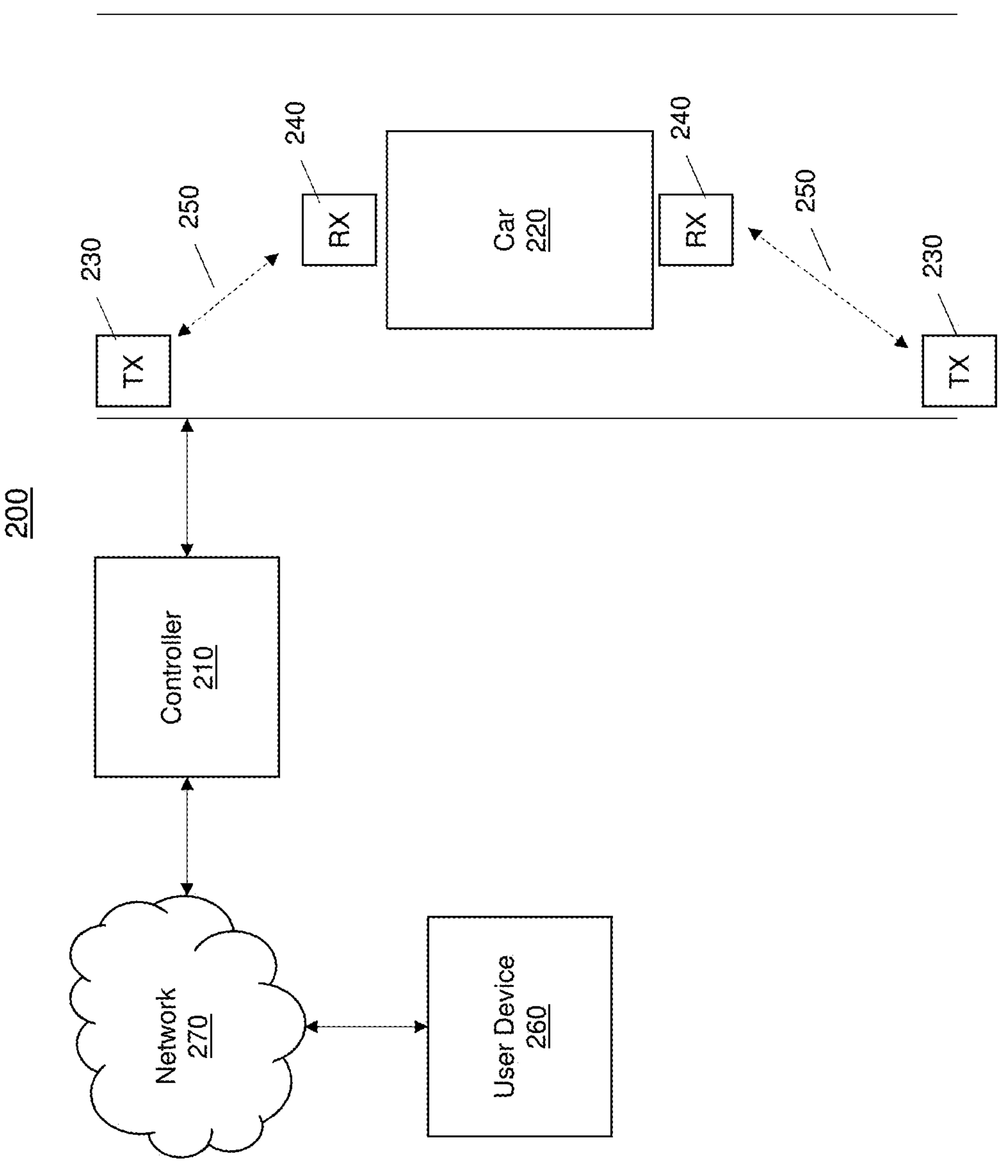
FIG. 2 depicts a safety system based on hoistway access detection in accordance with one or more embodiments.

FIG. 2 depicts a safety system for implementing hoistway access detection in accordance with one or more embodiments. The system 200 includes a controller 210 that is configured to control the elevator car 220 located in a hoistway. The controller 210 can be configured to communicate with the elevator car 220 over a wireless communication channel. As shown in FIG. 2, one or more transmitters 230 and receivers 240 can be arranged in the hoistway and/or on the elevator car 230 to provide wireless communication for controlling the elevator car 220 and provide a wireless communication option for passengers that are present inside the elevator car 220. These devices can be configured for one-way communication or two-way communication. For example, the one-way communication can include transmitting data from an elevator car 220 to the controller 210 or from the controller 210 to the elevator car 220. Two-way communication can include a bidirectional communication between the elevator car 220 and the controller 210. It should be understood the transmitters 230 and receivers 240 can be located on the same device or different devices. The transmitters 230 and receivers 240 can include devices such as access points, relays, routers, gateways, wireless signal rangers extenders, and the like. As communication signals are transmitted over a channel 250 between the transmitter 230 and receiver 240, a signal strength of the communication can be monitored to determine the presence of a person or object in the hoistway. The measured signal strength can be compared to a signal strength threshold that can be used determine if a safety action or other task should be performed. As shown, the transmitters 230 and receivers 240 are configured to detect the presence of a person or object above the elevator car 220 and in the pit of the hoistway. It should be appreciated that the arrangement of devices can be changed to meet the needs of the areas or zones to be monitored.

The system 200 also shows the controller 210 is operably coupled to a user device 260 over a network 270. The user devices 260 can be used by operators to receive alerts related to the status of the elevator car 220 and hoistway. Although FIG. 2 illustrates the transmitters 230 communicating with corresponding receivers 240, it should be understood that a single transmitter 230 can be used to communicate with multiple receivers 240 or multiple transmitters 230 can communicate with one or more receivers 240. The system 200 can select the signal strength threshold values based on the arrangement of transmitters 230 and receivers 240 in the hoistway. For example, parameters such as a distance and/or interference from the hoistway can be used to identify a signal strength threshold.

Figure 3:
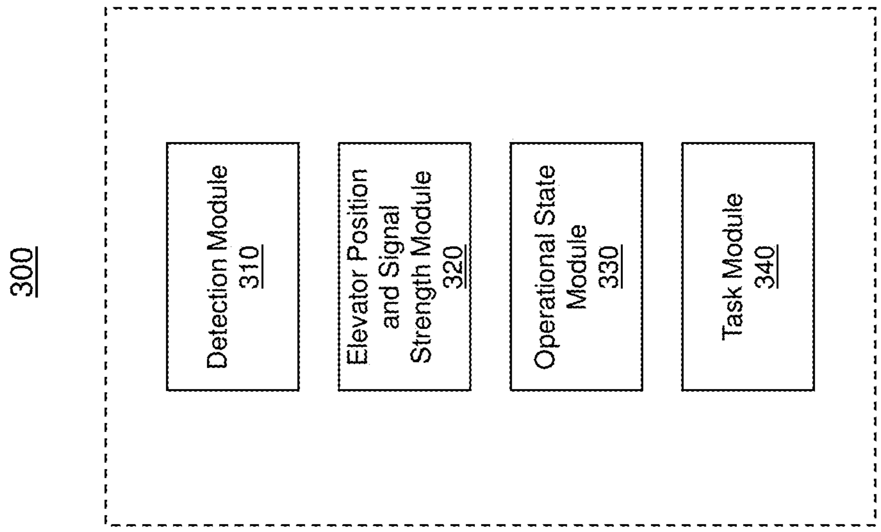
FIG. 3 depicts an example elevator controller.

Now referring to FIG. 3, an example controller 300 for controlling an elevator car is shown. The controller 300 includes a plurality of modules for implementing one or more processes described herein. It should be understood that the arrangement and configuration of modules are not intended to be limiting and other arrangements and configurations can be used. For example, the controller 300 can be an elevator controller such as that shown in FIG. 1. In other embodiments, the controller 300 can include be a standalone controller 300, a remote controller located in a cloud or some other external system. In some embodiments, the controller 300 can reside in the receiver of a wireless system that is operable to trigger a discrete or component in the controller 300. The controller 300 includes a detection module 310 that is configured to receive the measured signal strength data between a transmitter and receiver.

An elevator position and signal strength module 320 can be used to associate a position of an elevator car with a specific signal strength threshold value that is used to determine the presence of a person or object in the hoistway. The signal strength can be measured in dBm which represents the power ratio in decibels of the radio power per milliwatt. In one or more embodiments, the signal strength can be measured at a power level that is received at the receiver. The received signal strength (RSSI) can also be used to determine a power level being received where a higher value indicates a stronger signal. It should be appreciated that other standards for measuring the quality, clarity, signal power, or signal integrity can be used. In other embodiments, the quality can be inferred from data including the signal strength, packet loss, packet latency, etc. The elevator position is defined as the position of the elevator car in the hoistway. The elevator position can indicate a known distance away from a transmitter 230 which can be used to estimate an expected signal strength. For example, an elevator car that is closer to a transmitting source may expect to detect a higher signal strength than an elevator car that is much further from the transmitting source. In other embodiments, the elevator position can be mapped to a floor the elevator car is closest to or the elevator floor the elevator car is parked on. The interference of a signal can range based on the location of the car in the hoistway and the interfering obstacles that are present between a receiver on an elevator car and the wireless signal transmitter. For example, the existing elevator cables, wires, or other structures can provide interference to a transmitted signal and the length of the elevator cable or amount of other structures can change based on the elevator car's position in the hoistway.

In one or more embodiments, the elevator position and signal strength module 320 can collect elevator position data and the detected signal strength during a test mode. The data can be recorded when there is no interference in the hoistway or where there is a known interference and the data can be collected as the elevator travels through various positions in the hoistway. That is, because the signal power threshold can depend on the environment in which the signal propagates, during a test mode data power signal data can be collected in the elevator when no one is in the hoistway and when someone is inside the hoistway to determine the appropriate signal threshold. The position data can be mapped to the signal strength to determine an expected signal strength for a particular position. For example, the collected data for each elevator position can be averaged to determine an expected signal strength which can further be used to determine a signal strength threshold.

In one or more embodiments, the position of the elevator and the current signal quality/strength can be stored over time and used as a reference to determine if there is an additional interfering obstacle or person in the hoistway. The reference signal strength data can be stored and updated over time for each position of the elevator car in the hoistway. The update can be used to determine a signal strength threshold value that can be used as a threshold that is correlated to an obstacles presence in the hoistway.

The operational state module 330 is configured to store the current mode of the elevator car. For example, the elevator can be operated in a normal mode or a maintenance mode. If a maintenance technician was present in the hoistway, the system should detect the presence of the maintenance technician and not allow the elevator car to move which can potentially put the maintenance technician at risk of injury. In other embodiments, even if the maintenance technician is detected, the elevator can be operated in an override mode. This technique increases the safety of those service technicians that are detected in the hoistway. This technique offers an additional safety measure or redundant safety measure for service technicians that are present in the hoistway that may not have placed the elevator system in a maintenance mode. The system can be incorporated into existing systems to supplement current safety measures.

The task module 340 can be configured with particular tasks to perform responsive to the detection of a person or object in the hoistway of the elevator car. As an example, the elevator car can be automatically disabled, one or more operators can be alerted to the presence prior to allowing the elevator car to operate normally, an alarm or alert can be triggered. It should be understood that an array of other tasks or a combination of tasks can be performed responsive to the detection. The modules can be implemented in software, hardware, or a combination thereof.

Figure 4:
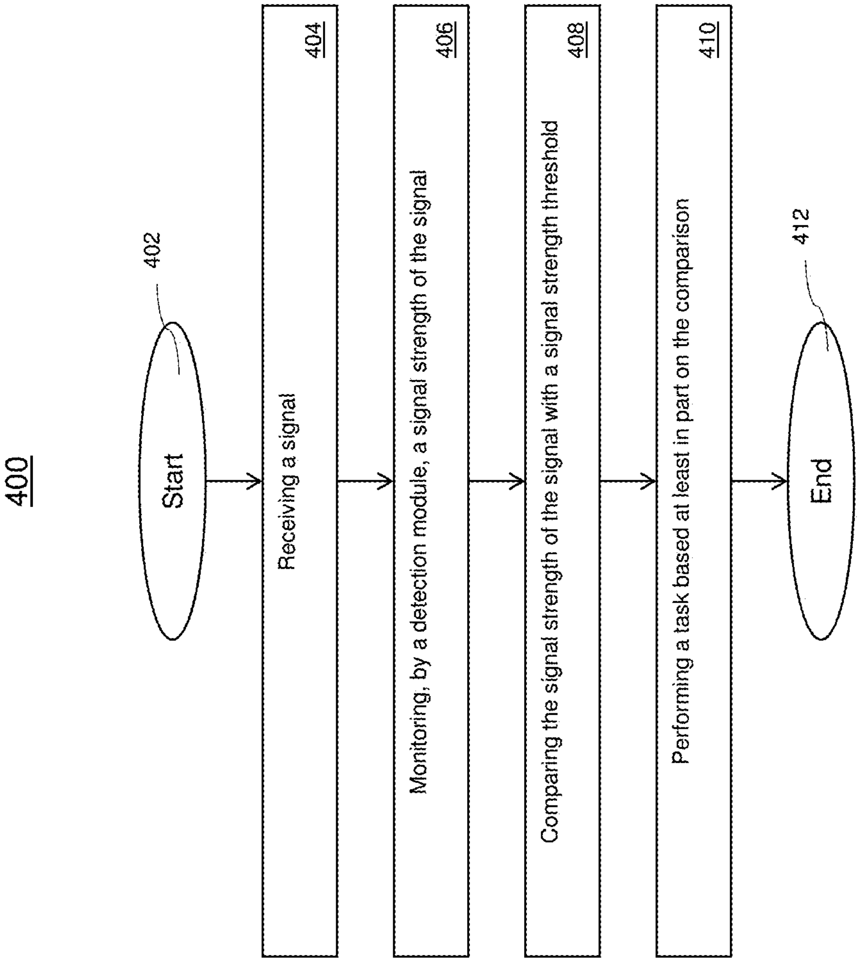
FIG. 4 depicts a flowchart of a method for operating a safety system based on hoistway access detection.

Now referring to FIG. 4, a flowchart of a method 400 for operating a safety system based on hoistway access detection is shown. The method 400 starts at block 402 and proceeds to block 404 which provides for receiving a signal. In one or more embodiments, the signal is a signal that is used for communication such as a Wi-Fi signal. Other wireless communication techniques can include using RF, Bluetooth, near-field communication (NFC), ZWave, Zigbee, etc. can be used. Method 400 proceeds to block 406 which provides for monitoring, by a detection module, a signal strength of the transmitted signal. The transmitter and/or receiver can be configured to measure the signal strength of the transmitted communication signal. The interference experienced by the signal can be represented as a signal loss, signal-to-noise ratio (SNR), dBm, RSSI, or represented by other parameters. Block 408 provides for comparing the signal strength of the transmitted signal with a signal strength threshold. In some embodiments, the signal strength threshold can be a default value that has been configured to represent the interference of the transmitted communication signal induced by a mechanic or service technician in the hoistway. In other embodiments, the signal strength threshold can be based on the position of the elevator in the hoistway which accounts for the cables and other structures that can change as the elevator car travels through the hoistway. In a different embodiment, the signal strength threshold can take into account a particular structure or equipment that is present in a certain portion of the hoistway that is not present in other. Any combination of these embodiments and other embodiments can be used. The signal strength threshold can also be updated over a period of time after performing various signal strength measurements to identify an individual's presence in the hoistway or the signal strength threshold can be manually configured. The method 400, at block 410, performs a task based at least in part on the comparison. In the event, the transmitted signal exceeds the allowable signal degradation indicated by the tunable or configurable signal strength threshold, the system can perform a number of actions including transmitting an alert to an operator indicating that a presence has been detected in the hoistway, prompting an operator to verify a particular operation of the elevator car should be taken, automatically disabling the movement of the elevator car, etc. In one or more embodiments, the signal degradation can be based on a deviation from an expected signal strength. The deviation can be based on a value that is determined during a test mode and correlated to the interference caused by a person or obstacle being present in the elevator hoistway. In other embodiments, the deviation from the measured signal strength for a period of time can be used to determine when a safety task or safety action should be taken. In other embodiments, the value that is used to indicate a degraded signal can be manually configured by an operator. In some embodiments, the signal strength threshold can be adjusted over a period of time so that the anomaly in the signal strength is detected. In other embodiments, the tunable threshold can be configured based on the position, signal drift, environmental factors, weather, etc. It should be appreciated that the system is not limited by the examples described above but can include performing other tasks responsive to determining the degradation of the transmitted signal. The method 400 can end at block 412 or one or more steps provided in the process can be repeated.

The technical effects and benefits include providing additional safety for technicians during hoistway inspection and a reduction in the number of incidents during elevator testing and maintenance.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A safety system for implementing presence detection, the system comprising:

a receiver and a transmitter arranged in a hoistway and/or on an elevator car operating in the hoistway, the receiver configured to wirelessly configured to receive a signal from a transmitter;

a detection module configured to detect a signal strength of the signal;

a processor configured to compare the signal strength of the signal with a signal strength threshold that is used to determine the presence of a person or object in the hoistway; and a task module configured to perform a task based at least in part on the comparison;

an elevator controller that is operably coupled to the processor, wherein the elevator controller is configured to control the elevator car;

an operational status module configured to track a current state of an elevator system comprising the elevator car.

2. The system of claim 1, further comprising an elevator position and signal strength module configured to associate a current position of the elevator car in the hoistway to a signal strength threshold, wherein the signal strength threshold is a configurable signal strength threshold.

3. The system of claim 1, further comprising an elevator position and signal strength module configured to associate a current position of the elevator car in the hoistway to an expected signal strength.

4. The system of claim 2, wherein the elevator position and signal strength module is configured to store signal strength threshold values during at least one of a normal mode of operation or a test mode of operation.

5. The system of claim 2, wherein the signal strength threshold is based on at least one of a position of the elevator car in the hoistway or a reduction in an expected signal strength of the signal.

6. The system of claim 1, further comprising the task module configured to transmit an alert indicating a presence of an object or person in the hoistway.

7. The system of claim 6, wherein the task module is configured to verify a current state of the elevator system by transmitting a prompt to an operator.

8. The system of claim 7, wherein the signal is a Wi-Fi signal.

9. A method for operating a safety system implementing presence detection, the method comprising:

receiving wirelessly a signal from a transmitter arranged in a hoistway and/or on an elevator car operating in the hoistway;

monitoring, by a detection module, a signal strength of the signal;

comparing the signal strength of the signal with a signal strength threshold that is used to determine the presence of a person or object in the hoistway;

performing a task based at least in part on the comparison; and controlling, by an elevator controller, the elevator car operating;

tracking a current state of an elevator system comprising the elevator car.

10. The method of claim 9, further comprising associating a current position of the elevator car in the hoistway to a signal strength threshold, wherein the signal strength threshold is a configurable signal strength threshold.

11. The method of claim 9, further comprising associating a current position of the elevator car in the hoistway to an expected signal strength.

12. The method of claim 10, storing signal strength threshold values during at least one of a normal mode of operation or a test mode of operation.

13. The method of claim 10, wherein the signal strength threshold is based on at least one of a position of the elevator car in the hoistway or a reduction in an expected signal strength of the signal.

14. The method of claim 9, further comprising transmitting an alert indicating a presence of an object or person in the hoistway.

15. The method of claim 14, further comprising verifying a current state of the elevator system by transmitting a prompt to an operator.

16. The method of claim 15, wherein the signal is a Wi-Fi signal.

17. The system of claim 2, wherein the signal strength threshold is based on position of the elevator car in the hoistway.

* * * * *